Sept. 10, 1935.  J. H. SLOCUM  2,013,863
DUMPING APPARATUS
Filed March 6, 1933

Inventor
Joseph H. Slocum
By
Attorneys

Patented Sept. 10, 1935

2,013,863

UNITED STATES PATENT OFFICE 2,013,863

DUMPING APPARATUS

Joseph H. Slocum, Long Beach, Calif.

Application March 6, 1933, Serial No. 659,595

7 Claims. (Cl. 166—19)

This invention relates to a dumping apparatus such as used in deep wells for dumping material, for example, cement to shut off water which is encountered in drilling the well.

It is the usual practice to put down a plug or "bridge" that must be placed below or at the perforations where the water is coming into the casing. This plug is for operating a cement dumper. There is difficulty in placing this plug accurately, and this may result in placing the plug above the location of the water, or too far below the water. Furthermore, the setting of this plug in place usually necessitates running a tool string down the casing, which entails considerable loss of time.

The general object of this invention is to provide a cement dumping device of simple construction, which can be employed to dump the cement with considerable accuracy at the point desired within the casing.

A further object of the invention is to provide a device of this kind, which can be operated on a sand line and without necessitating the placing of a plug or bridge in the casing, and which will operate effectively to hold the cement while it is being passed down the casing, and provided with means for releasing the cement actuated by simple relative movement of the parts of the device.

Further objects of the invention will appear hereinafter.

The invention consists in the novel parts and combinations of parts to be described hereinafter, all of which contribute to produce an efficient well cementing apparatus.

A preferred embodiment of the invention is described in the following specification, while the broad scope of the invention is pointed out in the appended claims.

In the drawing:

Figure 1 is a vertical section through a portion of the casing and also passing through portions of a cement dumper embodying my invention. In this view certain parts of the cement dumping device are shown in elevation or partially in elevation. This view illustrates the dumper in its closed position, that is to say, with the parts in the relation they have when the cement is retained in the device as though it is being lowered down the well.

Before proceeding to a more detailed description of the invention, it should be stated that it involves the use of a cement holder for retaining the cement and which is adapted to be lowered down the well. Associated with the cement holder, I provide means for engaging the wall of the casing, and this latter means is connected with the cement holder in such a way as to permit relative movement between the same. Through the agency of this relative movement, I effect the release of the cement.

In the preferred embodiment of the invention I employ a sleeve for engaging the wall of the casing and when the cement dumper is run down the well, this sleeve advances with the cement holder. When the tool string has been lowered to the proper level, by a relative movement, preferably an upward movement, the cement is released.

Although I do not limit myself to any particular direction of relative movement for effecting the release of the cement, I accomplish this in a simple manner by connecting a friction sleeve to the cement holder through the medium of a lost motion device which may take the form of a jar device such as used in connection with well drilling operations. Through this jar device motion is imparted to the sleeve to carry it down the well with the cement holder and through the agency of the relative movement of the parts of the jar, the release of the cement is effected.

Figure 1:
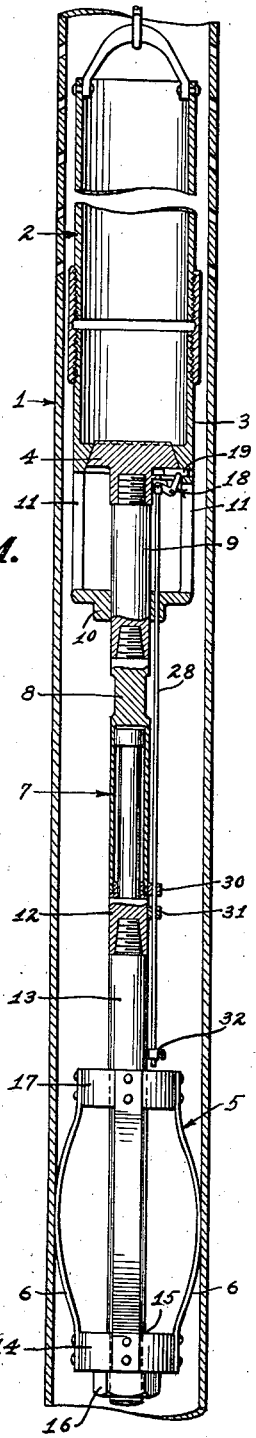

Referring more particularly to the parts, and especially to Figure 1, 1 indicates a casing within which the cement dumper is illustrated. This device includes a cement holder 2 which is preferably of tubular form having a bottom end 3 provided with a valve 4 which is held in a closed position while the dumper is passing down the well.

The device also includes means for frictionally engaging the wall of a casing which preferably consists of a friction sleeve 5 which may be of common cage form comprising a plurality of body springs 6 which engage the inner side of the casing. Between the cement holder and the friction sleeve I provide a lost motion device 7. In the present instance the friction sleeve 5 is located below the cement holder and the lost motion device is in the form of a jar device having an upper section 8 that is connected to the cement holder but preferably to the valve 4, the said section 8 including an extension 9 that slides freely through a guide collar 10 connected by cage bars 11 with the bottom 3 of the cement holder. The jar device includes a lower member 12 to which an extension 13 is attached and this extension is in the form of a rod that carries the sleeve 5. Any suitable means may be employed for attaching the sleeve. In the present instance this is accomplished by providing a lower collar 14 that is rigidly secured against an annular shoulder 15 on the bar 13 by means of a nut 16, and mounted to slide on the upper portion of the bar 13 I provide a sleeve 17 to which the upper ends of the springs 6 are attached. The lower ends of these springs are of course secured to the lower collar 14.

The valve 4, as illustrated, opens in a downward direction and in this type of device I provide releasing means preferably in the form of a latch device 18 for latching the valve in its closed position. In the present instance this latch device includes a sliding bolt 19 which is preferably provided with a rounded nose 20 to be received in a socket 21 formed in a flange or abutment 22 that projects down from the lower portion of the bottom 3. The inner end of this bolt slides in a guide opening 23 formed in a housing integral with the under side of the valve. The under side of the guideway or bore 23 is provided with a slot 24 through which the upper arm 25 of a rocker, in the form of a bell crank lever projects so as to engage loosely in a socket 26 on the under side of the bolt. The other arm 27 of this bell crank lever is connected with actuating means to enable the latch to be actuated by a relative movement of the cement holder with respect to the sleeve. In the present instance I employ a link in the form of a stem 28 that may have a pin and slot connection 29 with the arm 27, and this stem extends downwardly at the side of the jar device and is guided to slide freely through a guide 30 which is rigidly secured to the lower end of the upper member 8 of the jar device 7. This stem also passes through a lug 31 rigid with the lower member 12 of the jar device and when the device is moving down the well, the stem extends a considerable distance below the lug 31.

At a suitable point on the stem below the lug 31 I attach a stop preferably in the form of an adjustable collar 32. The upper end of the stem is guided to slide freely through the collar 10.

By reason of the fact that the stem 28 is guided through the guide member or lug 30 on the upper member 8 of the jar, a swivel jar can be employed for connecting the cement holder and the sleeve.

Figure 2:
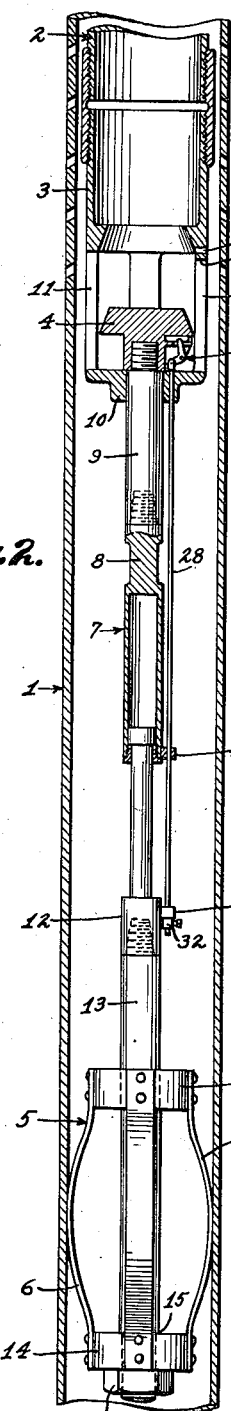
Figure 2 is a view similar to Figure 1, but representing the device in its dumping position as though releasing the cement from the cement holder.

In Figure 2 the parts are illustrated in the relation which they have when the valve is open as though the cement were being dumped from the cement holder.

Figure 3:
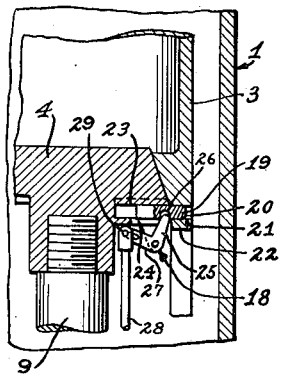
Figure 3 is a fragmentary vertical section, certain parts being broken away, and further illustrating details of a latch device which may be employed for effecting the release of the cement.

In the operation of the device when it is being run down the well, the jar is in the telescoped condition illustrated in Figure 1 and the friction sleeve 5 is pushed down the casing in advance of the cement holder. When the cement holder has been lowered to the desired level, the tool string carrying it is pulled upwardly, that is to say, it is given an upward movement with relation to the friction sleeve 5 which remains in a fixed position in the well. As this upward movement of the cement holder occurs, the collar 32 on the stem eventually strikes the lug 31 on the lower member 12 of the jar device which is connected to the friction sleeve. In this way a relative downward pull is given to the stem which will slide the latch 19 toward the left as viewed in Figure 3 and release its nose from the socket 21. The valve will then drop down the barred cage 11, releasing the cement. The tool string should then be pulled.

One of the advantages of the lost motion connection, is that it permits a limited relative upward movement of the friction sleeve without affecting in any way, the release of the cement. In the present construction, no movement of the releasing means is caused or permitted until the full amount of lost motion is taken up. This is very advantageous because it prevents any possibility of the cement being released prematurely by a slight accidental upward pull on the suspending line. The use of a jar for the lost motion device is advantageous because it permits a downward jar to be given to the sleeve in case it should tend to stick at any point as it is being lowered down the well. Where the load of cement is light, there might be a tendency for the friction sleeve to stick at some point in the casing.

It will be evident that any desired quantity of cement can be carried in the cement holder. This cement holder can be carried at its upper end on a tool string or on a sand line provided the weight of the cement holder and the cement in it is sufficient to overcome the frictional resistance of the friction sleeve 5.

It is understood that the embodiment of the invention described herein is only one of the many embodiments this invention may take, and I do not wish to be limited in the practice of the invention, nor in the claims, to the particular embodiment set forth.

If desired, after dumping the cement, pressure can be put on the head of the casing to force the cement out through the perforations.

What I claim is:

1. In a cement dumper for use in a well casing, the combination of a cement holder having a valve for retaining the cement, a friction sleeve disposed below the cement holder, valve holding means for holding the valve closed, a lost motion connection between the sleeve and the cement holder, a link extending down the side of the dumper from a point near the valve, and means for operating the link by a relative upward movement of the cement holder to move the valve holding means to a position to release the valve.

2. In a cement dumper for use in a well casing, the combination of a tubular cement holder having a valve for retaining cement, a friction sleeve, a lost motion device connecting the cement holder with the sleeve, a latch for holding the valve closed, a link extending down the side of the lost motion device for operating the latch, and means on the lower part of the lost motion device for actuating the link to release the latch when an upward movement of the cement holder occurs.

3. In a cement dumper for use in a well casing, the combination of a tubular cement holder having a valve for retaining cement, a friction sleeve, a lost motion device connecting the cement holder and the sleeve and including a part connected with the cement holder and a lower part attached to the sleeve, a latch for holding the valve closed, a stem guided down the side of the lost motion device and connected with the latch for operating the same, a collar carried by said stem, and means on the lower part of the lost motion device for engaging said collar when the cement holder is moved upwardly to release the latch.

4. In a cement dumper to be passed down a well casing, the combination of tubular means for holding the cement having a valve for retaining the cement, a friction sleeve disposed below the same for engaging the casing, a lost motion connection between the cement holding means and the friction sleeve enabling the sleeve to be pushed down the casing in advance of the cement holding means, a latch bolt guided to slide outwardly on the valve for engaging the holder to latch the valve closed, a rocker engaging the bolt, and means operated by a relative upward movement of the cement holding means for actuating the rocker to effect the opening of the valve.

5. In a cement dumper for use in a well casing, the combination of a tubular cement holder having a valve for retaining cement, a friction sleeve, a jar device connecting the sleeve with the cement holder and enabling the sleeve to be pushed down the casing in advance of the cement holder, a latch bolt for the valve, a bell crank lever pivoted on the valve and having an arm engaging the bolt, and means connected with the bell crank lever for actuating the latch by relative upward movement of the cement holder.

6. In a dumping apparatus for use in a deep well, the combination of a tubular holder, a valve for retaining material in the holder, a friction sleeve, a lost motion device connecting the sleeve with the holder and enabling the sleeve to be pushed down the well in advance of the holder, a pivoted rocker associated with the valve, means for holding the valve closed, means connected with the rocker and actuated by relative upward movement of the holder with respect to the sleeve to move the rocker, and means whereby the said movement of the rocker effects the release of the valve.

7. In a dumping apparatus for use in a deep well, the combination of a tubular holder, a valve for retaining material in the holder, a friction sleeve, a lost motion device connecting the sleeve with the holder including a part connected with the friction sleeve so as to move up or down with the same, said lost motion device enabling the sleeve to be pushed down a well in advance of the holder, a releasing means operating when moved to enable the valve to open, and means for actuating the releasing means including a part movably mounted on the holder and engaged by said first-named part when the holder moves upwardly relative to the friction sleeve.

JOSEPH H. SLOCUM.